United States Patent

Burtis et al.

[15] 3,664,446
[45] May 23, 1972

[54] ARTICULATED SNOWMOBILE VEHICLE

[72] Inventors: Wilson A. Burtis, 5011 Harvard Avenue, Westminster, Calif. 92683; Thomas T. Omori, 1601 Parway Drive, Glendale, Calif. 91206

[22] Filed: Oct. 16, 1970

[21] Appl. No.: 81,363

[52] U.S. Cl............................180/5 R, 180/9.24 A, 305/27, 305/35 EB
[51] Int. Cl...........................................B62m 27/02
[58] Field of Search.........................180/5 R, 9.24 A, 3, 4, 6; 280/21; 305/27, 35 EB

[56] References Cited

UNITED STATES PATENTS

| 2,661,249 | 12/1953 | Bonmartini | 305/35 EB |
| 3,469,553 | 9/1969 | Gagne | 180/5 R |
| 3,481,416 | 12/1969 | Caron | 180/5 R |
| 3,583,507 | 6/1971 | Trautwein | 180/5 R |

FOREIGN PATENTS OR APPLICATIONS 986,197  3/1951  France...................180/5 R

*Primary Examiner*—Richard J. Johnson
*Attorney*—William C. Babcock

[57] ABSTRACT

An articulated snowmobile vehicle that includes first and second frame assemblies that are pivotally connected to one another, with the first frame assembly being partially supported on snow, ice or bare ground by either skis, wheels or endless belts that are used for steering purposes, and the skis, wheels and belts being so supported that they may be pivoted laterally as well as longitudinally relative to the first frame assembly as the vehicle travels. The second frame assembly rotatably supports at least one power driven longitudinally extending endless belt of substantial width, with the lower reach of the belt being in frictional contact with the ground or snow thereon, and the belt when driven providing the motive power for the vehicle. The power driven belt when the vehicle travels over rough terrain may pivot in a vertical plane relative to the skis, wheels or steering belts due to the articulated connection between the first and second frame assemblies.

16 Claims, 13 Drawing Figures

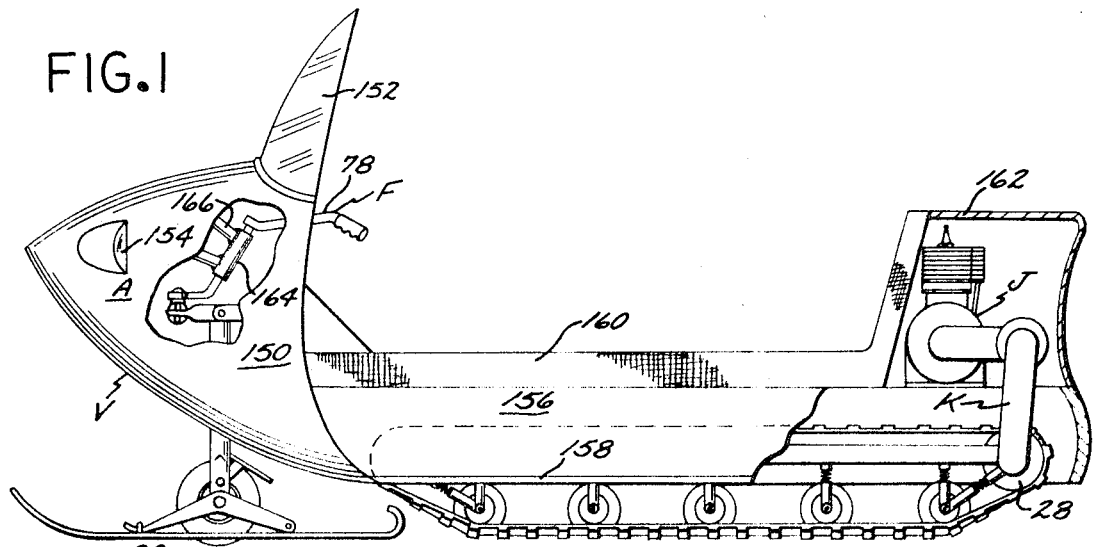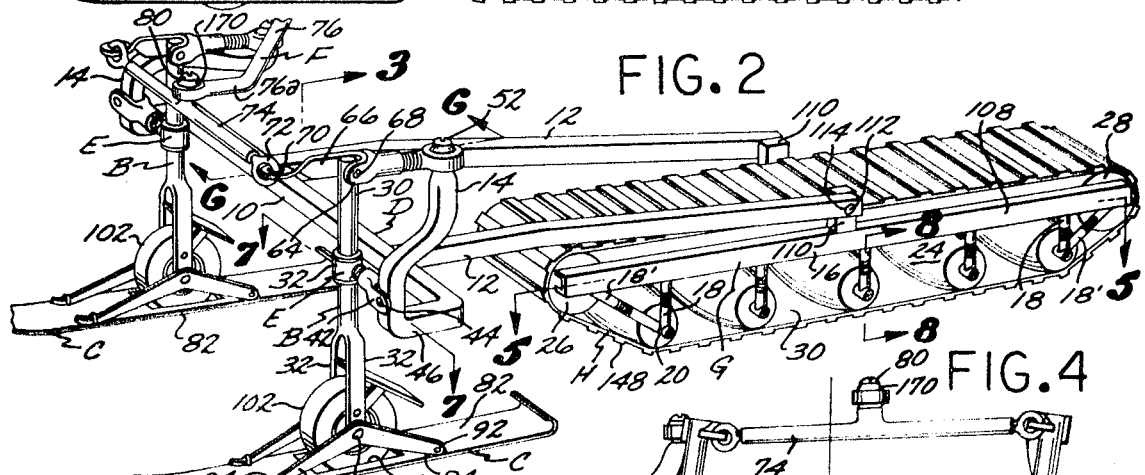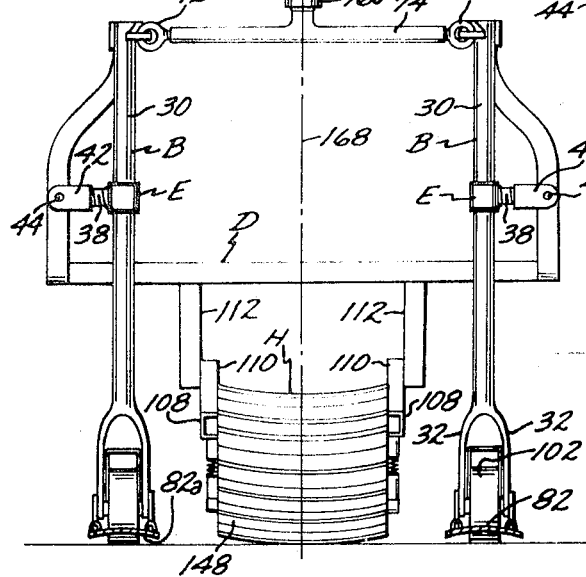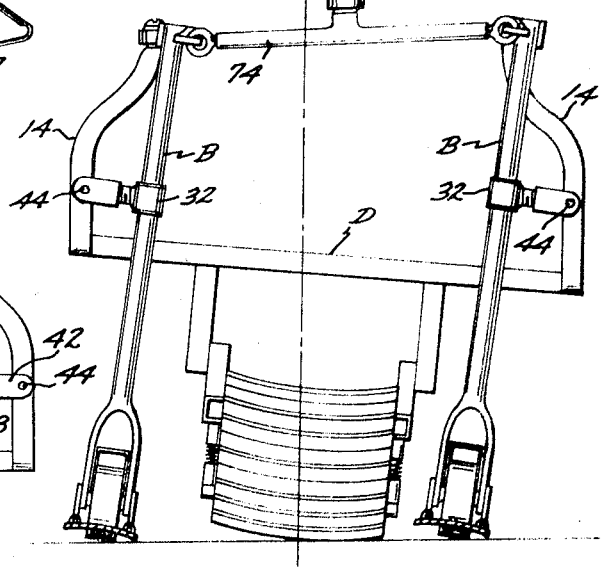

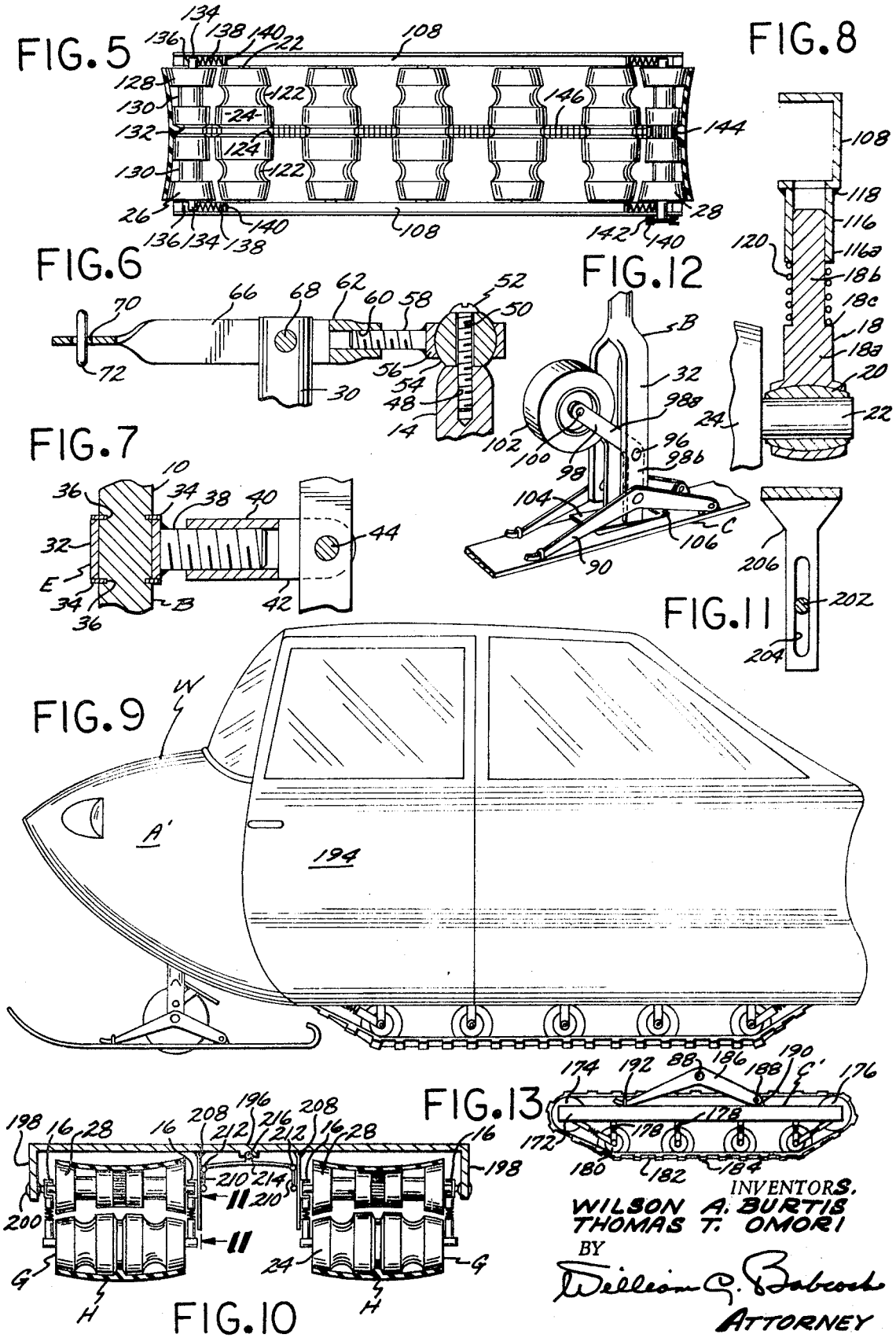

ARTICULATED SNOWMOBILE VEHICLE

BACKGROUND OF THE INVENTION

1. Field of the Invention

Articulated snowmobile vehicle having pivotally connected first and second frame assemblies to permit relative movement therebetween as said vehicle traverses uneven terrain.

2. Description of the Prior Art

Numerous power driven snowmobile vehicles have been developed and manufactured in the past that include a power driven endless belt that contacts the snow surface and a pair of forwardly disposed skis for steering purposes. The skis and belt are rigidly supported from a single frame in such prior art vehicles, and as a result the frame is placed under a substantial stress when the vehicle travels over an uneven terrain where the lower reach of the belt and the snow contacting surfaces of the skis do not lie in a common plane. The primary purpose in devising the present invention is to provide an improved snowmobile that does not have the operational disadvantages of prior art devices of this nature.

SUMMARY OF THE INVENTION

A snowmobile vehicle of the type that includes a power driven endless belt to actuate the vehicle and a pair of skis, wheels or endless belts for steering the vehicle. The vehicle is characterized by the steering means and power driven belt being independently supported on first and second frame assemblies that may pivot relative to one another in a vertical plane as the vehicle traverses rough terrain, and the steering means being so supported from the first frame that may pivot laterally as well as longitudinally relative thereto.

A number of transverse longitudinally spaced rollers so support the power driven belt from the second frame that the lower reach of the belt has the exterior surface thereof in a transverse convex configuration. The rollers are mounted on transverse shafts that are journalled in the lower end portions of spring loaded struts that depend from the second frame, and as a result the shafts and rollers may flex transversely and vertically relative to one another to maintain a maximum portion of the exterior surface of the belt in contact with snow, ice or ground as the vehicle travels over an uneven terrain.

A major object of the present invention is to provide a snowmobile in which the steering means and driven endless belt thereof are independently supported from first and second frame assemblies that may pivot relative to one another as the vehicle travels over uneven terrain to minimize the stress placed on said frames.

Another object of the invention is to supply a snowmobile in which the steering means may pivot laterally as well as longitudinally relative to the first frame to minimize the stress placed on the first frame as well as to improve the steering characteristics of the vehicle.

A further object of the invention is to furnish a snowmobile in which the endless power driven belt is supported on a number of longitudinally spaced transverse rollers of such shape that the exterior surface of the belt in contact with the ground has a transverse convex configuration, and the rollers being transversely movable relative to one another to maintain a maximum portion of the exterior surface of the belt in contact with the ground snow or ice for maximum traction as the vehicle traverses uneven terrain.

Another object of the invention is to provide a snowmobile that may include dual power imparting endless belts that are disposed side by side, and one that will have the same operational advantages as the vehicle that has but a single belt.

A further object of the invention is to furnish a snowmobile that may have an enclosed cab if desired, and be powered by either a single or multiple endless power driven belts that frictionally contact the ground, snow or ice.

Yet another object of the invention is to provide a snowmobile in which the operator may selectively use either skis, wheels or endless belts for steering purposes.

BRIEF DESCRIPTION OF THE DRAWINGS

FIG. 1 is a side elevational view of a first form of the invention, with the rear portion thereof cut away to illustrate the location of the power unit;

FIG. 2 is a perspective view of the first form of the invention illustrating first and second pivotally connected frame assemblies that support the steering skis and endless power driven belt;

FIG. 3 is a transverse cross sectional view of the first form of the device taken on the line 3—3 of FIG. 2;

FIG. 4 is the same transverse cross sectional view shown in FIG. 3 but illustrating the manner in which the steering skis and wheels may pivot transversely relative to the first frame assembly and the uprights supporting the skis and wheels concurrently rotate part of a revolution of the longitudinal axis thereof;

FIG. 5 is a longitudinal cross sectional view of the first form of the vehicle taken on the line 5—5 of FIG. 2;

FIG. 6 is a fragmentary longitudinal cross sectional view of the first form of vehicle taken on the line 6—6 of FIG. 2;

FIG. 7 is a fragmentary transverse cross sectional view of the first form of vehicle taken on the line 7—7 of FIG. 2;

FIG. 8 is a fragmentary vertical cross sectional view of the first form of vehicle taken on the line 8—8 of FIG. 2;

FIG. 9 is a side elevational view of a second form of snowmobile that uses dual belts for tractive purposes;

FIG. 10 is a transverse cross sectional view of the second form of vehicle shown in FIG. 9 taken on the line 10—10 thereof;

FIG. 11 is a fragmentary side elevational view of a portion of the second form of vehicle taken on the line 11—11 of FIG. 10;

FIG. 12 is a perspective view of one of the combined wheel and ski steering assemblies, with the wheel being disposed in an inoperative position; and FIG. 13 is a side elevational view of the second frame assembly of the second form of vehicle.

DESCRIPTION OF THE PREFERRED EMBODIMENTS

The first form of the vehicle V shown in FIGS. 1 and 2 includes a hollow protective body A for the operator (not shown). The first form V of the vehicle includes two laterally spaced uprights B as may best be seen in FIG. 2 that support steering means C on the lower ends thereof as shown in FIG. 2.

A first frame assembly D is provided that includes a cross piece 10 that has two laterally spaced cantilever side pieces 12 projecting rearwardly therefrom. The cross piece 10 has two upwardly extending members 14 on opposite ends thereof. Journal means E pivotally support the uprights B from the members 14 as shown in FIG. 2. Manually operable steering means F are provided for the first form of vehicle V as illustrated in FIGS. 1 and 2.

The first form of vehicle V includes a second frame assembly G that is best seen in FIGS. 2. The second frame assembly G includes two parallel laterally spaced side members 16 that have a number of transversely aligned pairs of downwardly extending spring loaded struts 18 secured thereto as shown in FIGS. 2 and 8. Each of the struts 18 has a transversely disposed bearing 20 on the lower end thereof. Each pair of bearings 20 rotatably engages the end portions of a transverse shaft 22 that is best seen in FIG. 5. Each of the shafts 22 has a first roller 24 mounted thereon.

Forward and rearward rollers 26 and 28 are rotatably supported from the ends of the second frame assembly G as shown in FIG. 2 and are longitudinally aligned with the first rollers 24. A flat exteriorly cleated endless belt H formed of a resilient material and of substantial width is supported on the forward and rearward rollers 26 and 28 and has the lower reach 30 thereof in pressure contact with the exterior surface of the first rollers 24. Power means J are supported on the rearward portion of the first form of the vehicle V and have power transmission means K associated therewith that drive the rearward roller 28 in such a direction that the lower reach 30 of belt H moves rearwardly relative to the second frame assembly G.

Each of the uprights B as may be seen in FIGS. 2 to 4 inclusive includes a straight portion 30 that on its lower end develops into two laterally spaced, parallel, downwardly extending arms 32. Each upright portion 30 had a collar 32 rotatably supported thereon that forms a part of the journal means E, and the collar being removably held in place on the upright portion 30 by two resilient lock rings 34 as shown in FIG. 7. The lock rings 34 removably engage circumferentially extending recesses 36 formed in the straight portion 30. Each of the collars 32 has a threaded rod 38 projecting outwardly therefrom that engages an internally tapped sleeve 40 as shown in FIG. 7. Each sleeve 40 develops into a bifurcated portion 42 that extends on opposite sides of the lower portion of one of the members 14 and is pivotally secured thereto by a pin 44. Each of the upwardly extending members 14 is preferably in the shape of a compound curve, and with the lower end of the member merging with a short leg 46 that extends forwardly from an end of the cross piece 10. The upper end of each member 14 has a tapped bore 48 extending downwardly therein that is engaged by the shank 50 of a screw 52. The screw 52 serves to secure a ball 54 to the upper end of the upright 14. Each ball 54 is rotatably engaged by a socket-like member 56 that has a threaded rod 58 extending therefrom.

The rod 58 engages a tapped recess 60 formed in a member 62, with the member 62 on its forward end developing into first and second arms 64 and 66 respectively. A pin 68 extends through transversely aligned bores formed in the arms 64 and 66, as well as in the upright portion 30, and pivotally secures the member 62 to the upright. The member 62 is also pivotally secured to the upper end of the member 14 due to the socket-like member 56 pivotally engaging the ball 54 as shown in FIG. 6.

Each of the second arms 66 has an opening 70 formed therein. The openings 70 are pivotally engaged by rings 72 that are secured to opposite ends of a transverse rigid cross bar 74 as shown in FIG. 2. The cross bar 74 has steering means F secured thereto.

The steering means F includes a rigid upwardly extending bar 76 that develops on its upper end into bicycle-like handles 78 partially shown in FIG. 1. The bar 76 has a lower horizontal portion 76a in which a downwardly extending bore is formed (not shown) and through which bore a screw 80 extends to engage a vertically extending tapped bore (not shown) formed in the cross bar 74. When the steering means F is pivoted horizontally by manual means, the cross bar 74 is likewise so pivoted, and concurrently pivots and laterally tilts the uprights B and the steering means C secured to the lower ends thereof.

The steering means C as may best be seen in FIG. 2 includes two skis 82 having curved forward ends 84 and longitudinally extending slots 86 formed in substantially the centers thereof. The lower extremities of each pair of arms 32 are by rivets 88 secured to the center of two angular horizontally positioned brackets 90. Each of the brackets 90 is by a pin 92 pivotally secured to a lug 94 that extends upwardly from an edge portion of one of the skis 82. The forward end portion of each of the brackets 90 is secured to one of the skis 82 by a U-shaped member 94. The U-shaped members 94 permit relative movement of the skis 82 to the forward portion of the brackets 90 as the skis flex longitudinally due to traveling over uneven terrain. Each pair of arms 32 by means of pins 96 pivotally support two laterally spaced parallel rigid members 98, with each member including sections 98a and 98b that are angularly disposed relative to one another. Each pair of sections 98a as may be seen in FIG. 14 have a transverse shaft 100 extending therebetween that rotatably supports a wheel 102. Each pair of sections 98b on their free ends are secured to a rectangular plate 104 of such size as to be insertable within the opening 86.

When the sections 98a are vertically disposed as illustrated in FIG. 2, the wheels 102 project downwardly through openings 86, and permit the first form of vehicle V to travel over bare ground without the skis 82 slidably contacting the same. However, when the ground is covered with snow, and wheels 102 are positioned as shown in FIG. 14, with the plate 104 disposed to fill the openings 86, and thus provide a smooth surface on the skis 82 to engage snow or ice. The plates 104 are provided with stops 106 on the rearward ends thereof to prevent the plates 104 inadvertently being displaced from the openings 86 as the skis 82 move forwardly over a snow or ice-covered surface (not shown). Conventional stop means are provided to hold the wheels 102 in the position shown in FIG. 2, or the plates 104 in the positions illustrated in FIG. 14. The skis 82 preferably have concave lower surfaces 82a to permit the skis to bite into the snow when the uprights B are angularly disposed relative to the first flat assembly D when disposed as shown in FIG. 4.

The second frame assembly G as best seen in FIGS. 2, 3 and 4 includes two laterally spaced parallel side members 108 that have lugs 110 projecting upwardly from substantially the center thereof. Pins 112 extend outwardly from the lugs 110 and engage transverse bores 114 in the rearward ends of the cantilever side pieces 12 as shown in FIG. 2 to pivotally support the second frame G from said side pieces.

Each spring loaded strut 18 as may best be seen in FIG. 8 includes a sleeve 116 that by welding beads 118 or otherwise is supported in a depending position from the lower portion of one of the side members 108. The strut 18 includes a lower portion 18a as may best be seen in FIG. 8 that at the junction with an upper portion 18b of smaller transverse cross section defines a body shoulder 18c. The lower portion 18a has one of the bearings 20 secured thereto. A compressed helical spring 120 encircles the strut portion 18b, with the lower end of the spring in abutting contact with shoulder 18c, and the upper end of the spring being in pressure contact with the lower end 116a of sleeve 116.

First rollers 24 are mounted on the shafts 22, with the rollers having a convex barrel-like exterior surface. Each roller 24 has a pair of circumferentially extending laterally spaced first grooves 122 formed therein as shown in FIG. 5, and each roller also having a second circumferentially extending groove 124 situated between the first pair of grooves 122. The forward roller 26 has a cylindrical concave exterior surface 128 in which pairs of first grooves 130 are formed that are longitudinally aligned with the grooves 122, and a second groove 132 that is longitudinally aligned with the grooves 124 as shown in FIG. 5. The first roller 26 is mounted on a transverse shaft 134 that has the ends thereof rotatably supported in bearings 136 that are longitudinally movable on the side members 108. The side members 108 are preferably formed on angle iron to slidably support the bearings 136. Compressed helical springs 138 have the forward ends thereof in pressure contact with the bearings 136 and the rearward end of the springs in abutting contact with stops 140 secured to the side members 108.

The rearward roller 28 as may best be seen in FIG. 5 is of the same configuration as the forward roller 26 and is supported from the side member 108 in the same manner as the forward roller. The supporting means for the rearward roller 28 from the side members 108 are shown in FIG. 5 and are identified by the same numerals used in conjunction with the supporting means for the side roller 26. The shaft 134 of the rearward roller 28 has a sprocket 140 mounted thereon that engages an endless driven chain belt 142 that forms part of the power transmission assembly K extending from the engine J. The diameter and radius of curvature of the exterior surfaces of the first rollers 24 are so selected relative to the diameter and radius of curvature of the forward and rearward rollers 26 and 28, that substantially the same longitudinal tension is exerted on all transverse sections of the belt G as the same is rotated by the rearward roller 28. The second groove 132 on the rearward roller 28 has circumferentially spaced teeth 144 formed therein, that engage a sequence of longitudinally spaced lugs or teeth 146 that project from the inner surface of the belt H. The belt H as may best be seen in FIG. 2 has a number of longitudinally spaced transversely extending cleats 148 formed on the outer surface thereof to frictionally engage the ground, snow or ice as the first form of vehicle V is propelled thereover. The rearward roller 28 as viewed in FIG. 1 is driven in a counterclockwise direction, and as a result the lower reach of the belt H that is in contact with the ground, ice or snow is moved rearwardly to propel the first form of vehicle V forwardly. The most forwardly and rearwardly of the first rollers 24 are not only supported by vertically positioned spring loaded struts 18 but by angularly disposed struts 18' as well.

The body A on the first form V of the vehicle includes a nose portion 150 that has a windshield 152 extending upwardly therefrom, and one or more lights 154 mounted thereon, to permit the vehicle to be used at night. The body A includes a longitudinally extending, centrally disposed portion 156 that has elongate floor sections 158 extending outwardly in opposite directions from the lower portions thereof. The longitudinally extending portion 156 preferably supports an elongate seat or cushion 160 that the operator and passengers (not shown) on the vehicle straddle when the vehicle is in use. The body 18 terminates on the rearward portion thereof in an upwardly extending compartment defining means 162 that serves to house the engine J. The grooves 122 and 130 formed in the first rollers 24 and the forward and rearward rollers 26 and 28, cooperate with the belt H to permit snow or ice that enters the confines of the belt to be thrown therefrom as the rollers rotate. Control means are provided, but not shown, for controlling the starting and rate of operation of the engine J, when the operator of the vehicle is astride the body portion 156 and has his hands in gripping contact with the steering means F.

The rod 76 that forms a part of the steering means F is rotatably supported in an elongate bearing sleeve 164 that as may best be seen in FIG. 1, which bearing is supported by conventional bracket means 166 from the interior of the body portion 150. When the handlebars 78 are pivoted, the rod 76 is likewise pivoted with the cross piece 74 being shifted laterally. The cross piece 74 when the vehicle V is being propelled along a straight path occupies the position shown in FIG. 3, where the screw 80 is vertically aligned with the transverse center of the belt H, as indicated by the center line 168 shown in FIG. 3.

However, upon the cross piece 74 being shifted laterally the screw 80 shifts to the right as viewed in FIG. 4. The connection between the steering rod portion 76a is of a ball and socket structure 170 of which the screw 80 forms a part. When the steering cross piece 74 is shifted to the right as viewed in FIG. 4, the journal means E on the left hand upright B as viewed in that figure has the pin 44 thereof raised and the journal means E on the upright 30 to the right has the pin 44 thereof lowered. The pins 44 are connected to the members 14 and as a result not only are the uprights B pivoted laterally as viewed in FIG. 4, but the cantilever side pieces 12 and the second frame G together with the belt H mounted on the second frame.

This lateral tilting causes the right hand side of the belt H as viewed in FIG. 4 to contact the surface on which the vehicle V rests with the result that the belt has substantially the same tractive force when the vehicle is pursuing a straight path or turning. The second arms 66 as viewed in FIG. 2 at all times remain in vertical alignment with the skis 82. When the steering cross piece 74 shifts laterally as viewed in FIG. 4, the second arms 66 pivot about the longitudinal axis of the screws 52 as shown in FIGS. 2 and 6, and in so doing the skis 82 will have the longitudinal axes thereof disposed at an angle relative to the longitudinal axis of the first frame assembly D and second frame assembly G. The skis 82 preferably have transversely curved lower surface 82a, to permit the skis to bite into snow or ice when they are tilted laterally as viewed in FIG. 4.

When the vehicle V is being used on snow or ice the wheels 102 occupy the position shown in FIG. 12, rather than in the operative position illustrated in FIGS. 3 and 4. In the event the first form V of the invention is to be used on bare ground, the steering means C shown in FIG. 2 may be removed from the uprights B and replaced by the steering means C' shown in FIG. 13. The steering means C' includes two laterally spaced side pieces 172 that rotatably support forward and rearward rollers 174 and 176 respectively. A number of spring loaded struts 178 extend downwardly from the side pieces 172 and rotatably support a number of first rollers 180 therebetween in the same manner as previously described in detail in connection with the rollers 24 mounted on the second frame assembly G. The forward and rearward rollers 174 and 176, and rollers 180 are engaged by a flexible endless belt 182 that preferably has a sequence of longitudinally spaced transverse cleats 184 on the exterior surface thereof. Two laterally spaced brackets 186 have rearward ends thereof pivotally secured by pins 188 to lugs 190 that extend upwardly from the side pieces 172. The forward ends of the brackets are movably secured to the side pieces 172 by U-shaped members 192 that extend upwardly therefrom. The brackets 186 are secured to the arms 32 of the uprights B by pins 88 as previously described in connection with securing the brackets 90 to the arms 32.

A second form W of the snowmobile is shown in FIGS. 9 and 10, in which the body A' thereof is completely enclosed, and includes a door 194 for access thereinto.

The second form W of the vehicle has two of the second frame assemblies G situated under the rearward portion thereof as illustrated in FIGS. 9 and 10. The lower portion of the body A' is defined by a rectangular horizontal panel 196 from the longitudinal sides of which two flanges 198 extend downwardly. The two frame assemblies G as shown in FIG. 1 are transversely spaced from one another. The outwardly disposed side pieces 16 of each of the second frame assemblies G are pivotally connected to the flanges by ball and socket members 200. The inwardly disposed side pieces of the two second frame assemblies G have pins 202 extending outwardly therefrom as may be seen in FIG. 11 that slidably engage elongate vertical slots 204 formed in downwardly depending members 206 secured to the underside of the member 196 by pivotal connections 208. The outer end of the pins 202 are pivotally connected to the lower ends of two vertically extending links 210.

The upper ends of the links 210 have pivotal connections 212 thereon that serve to connect the links to a transverse resilient member 214 that is secured to substantially the center of the member 196 by a ball and socket connection 216. Belts H are rotatably supported on the second frame assemblies G by first rollers 24 and forward and rearward rollers 26 and 28 in the same manner as previously described in connection with the second frame assembly G shown in FIG. 2. The dual frame assemblies G provide greater traction, as the lower reaches of both belts H and in frictional contact with the ground surface. However, the second form W of the invention operates in substantially the same manner as the first form, but with the engine J driving both of the belts H by dual power takeoffs K (not shown) from the engine.

The use and operation of both the first form V of the vehicle and second form W has been explained previously in detail and need not be repeated.

We Claim:

1. A snowmobile vehicle of the type that includes a pair of steering skis and at least one endless traction imparting belt that has a lower reach thereof in frictional contact with the surface on which said vehicle rests, said vehicle being characterized by including:
    a. first and second elongate frame assemblies that are longitudinally aligned and pivotally connected to one another;
    b. roller means for rotatably supporting said belt from said second frame assembly, which second frame assembly is rearwardly disposed relative to said first frame assembly;

c. two laterally spaced uprights disposed forwardly of said first frame and having said skis connected to the lower ends thereof;
d. first means pivotally supporting said uprights from said first frame;
e. manually operable steering means for concurrently tilting said uprights and skis by said first means laterally relative to said first frame and pivoting said uprights and skis relative to said first frame to dispose the longitudinal axis of said skis at an angle relative to the longitudinal axis of said first and second frames for steering purposes, with said second frame and power driven belt capable of pivoting vertically relative to said first frame and skis as said vehicle is propelled by said belt over uneven terrain; and
f. power means on said second frame assembly for rotating said roller means and said belt.

2. A snowmobile as defined in claim 1 in which said first frame assembly includes two laterally spaced upwardly extending members adjacently disposed to said uprights, and said first means includes:
g. two collars rotatably supported at fixed elevations on said uprights;
h. two bifurcated members secured to said collars and extending on opposite sides of said members;
i. two first pins pivotally connecting said bifurcated members to said upwardly extending members;
j. two bodies that define first and second arms that extend on opposite sides of the upper portions of said uprights;
k. two second pins that pivotally connect said first and second arms to the upper ends of said uprights; and
l. ball and socket means that pivotally connect said bodies to the upper end portions of said members, with said steering operatively connected to said second arms.

3. A snowmobile as defined in claim 2 in which said steering means includes:
m. an elongate transverse cross piece pivotally connected to said second arms;
n. upwardly and rearwardly extending bearing means that occupy a fixed position on the forward portion of said first frame assembly;
o. a steering rod rotatably supported in said bearing means, said rod including a lower forwardly extending extension that is at an angle relative to the balance of said rod;
p. means pivotally connecting said extension to said cross piece; and
q. handle means on an upper end of said rod for pivoting said rod in said bearing to steer said vehicle.

4. A snowmobile vehicle as defined in claim 1 in which said roller means includes:
f. a plurality of longitudinally spaced, transverse first rollers having barrel-shaped exterior surfaces that are rotatably supported from said second frame assembly; and
g. a forward and rearward roller rotatably supported from said second frame assembly at opposite ends of said plurality of first rollers and in longitudinal alignment therewith, said forward and second rollers having concave exterior surfaces and being positioned on said second frame assembly at a greater elevation than said first rollers, with said forward and rearward rollers and said first rollers so supporting said belt that said lower reach thereof has an exterior surface of transverse convex configuration, and the diameters and radius of curvature of the exterior surfaces of said first rollers so related to the diameter and radius of curvature of the exterior surface of said first and second rollers that said belt has at least said lower reach thereof in uniform tension as said belt is rotated.

5. A snowmobile vehicle as defined in claim 4 in which said second frame assembly includes:
h. two elongate, parallel laterally spaced side pieces;
i. a plurality of pairs of transversely aligned spring loaded struts that depend from said side pieces;
j. a plurality of pairs of transversely aligned bearings on the lower ends of said struts; and k. A plurality of transverse shafts that have said first rollers mounted thereon, with the end portions of said shafts journalled in said bearings, and said first rollers being independently movable in a vertical direction as said vehicle travels over uneven terrain due to said shafts being supported by said spring loaded struts.

6. A snowmobile vehicle as defined in claim 5 in which said second frame assembly further includes:
l. forward and rearwardly disposed pairs of transversely aligned bearings that are longitudinally movable on said sidepieces;
m. forward and rearward transverse shafts rotatably supported in said bearings, and said forward and rearward shafts having said forward and rearward rollers mounted thereon; and
n. spring means that at all times tend to move said forward and rearward bearings, said forward and rearward shafts and forward and rearward rollers away from one another to maintain said belt in a taut position on said rollers.

7. A snowmobile vehicle as defined in claim 4 in which said uprights, first means and steering means are so operatively associated with said first and second frame assemblies that first and second frame assemblies and said belt tilt laterally in conformity with the tilting of said uprights, and said belt as it tilts laterally having a longitudinal section of the exterior surface of said lower reach thereof in contact with the surface on which said vehicle is supported.

8. A snowmobile vehicle as defined in claim 1 in which said skis have longitudinally extending openings therein, and said vehicle further including:
g. a pair of wheels disposed above said skis and vertically aligned with said openings; and
h. means for so rotatably supporting said wheels from said uprights that said wheels may be moved from a first inoperative position to a second operative position where lower portions of said wheels extend downwardly through said openings to rest on the surface on which said vehicle rests, with said wheels when in said second position serving to steer said vehicle, and said wheels when in said second position maintaining said skis at an elevated position out of contact with said surface.

9. A snowmobile vehicle as defined in claim 8 which further includes:
i. a pair of plates movably supported from said openings when said wheels are in said first position.

10. A snowmobile vehicle as defined in claim 1 in which said roller means support two of said endless belts side by side in parallel laterally spaced relationship.

11. A steering device for use with a vehicle having at least one rigid frame that has two laterally spaced upwardly extending members on the forward end thereof, said device including:
a. two rigid elongate uprights adjacently disposed to said members;
b. two collars rotatably supported at fixed elevations on said uprights;
c. two transversely disposed rigid members that extend outwardly in opposite directions from said collars;
d. first means for pivotally connecting outer ends of said transverse members to said upwardly extending members;
e. second means on the lower ends of said uprights that movably contact the surface on which said vehicle is supported;
f. two elongate bodies pivotally connected to the upper ends of said uprights and upwardly extending members, with each of said bodies including a portion that extends forwardly therefrom;
g. an elongate transverse cross piece pivotally connected to said portions of said bodies;
h. upwardly and rearwardly extending bearings means that occupy a fixed position on said vehicle;
i. a steering rod rotatably supported in said bearing means, said rod including a lower forwardly extending extension that is at an angle relative to the balance of said rod;

j. third means pivotally connecting said extension to said cross piece; and k. handle means on the upper end of said rod for pivoting said rod in said bearing means to steer said vehicle.

12. A steering device as defined in claim 11 in which said second means is a pair of parallel skis.

13. A steering device as defined in claim 11 in which said second means is a pair of wheels rotatably supported on said uprights.

14. A steering device as defined in claim 11 in which said second means are a pair of roller supported endless belt assemblies that are laterally spaced and parallel to one another.

15. A drive mechanism for a vehicle that includes:

a. two elongate, parallel laterally spaced side pieces;

b. a plurality of pairs of transversely aligned spring loaded struts that depend from said side pieces;

c. a plurality of pairs of transversely aligned bearings on the lower ends of said struts;

d. a plurality of transverse shafts rotatably supported in said pairs of bearings;

e. a plurality of first rollers supported on said shafts between said side pieces, each of said first rollers having a convex exterior surface;

f. forward and rearward transverse rollers rotatably supported on opposite ends of said side pieces and in longitudinal alignment with said first rollers, with said forward and rearward rollers each having concave exterior surfaces;

g. a flat endless belt of substantial width rotatably supported on said first rollers and forward and rearward rollers, with said belt formed of a material that permits it to conform to the exterior surfaces of said rollers, said belt having a lower reach thereof that has an exterior surface that is convex in a transverse direction and frictionally engages the surface on which said vehicle rests, and said exterior surface of said lower reach having a substantial longitudinal section thereof in contact with said supporting surface when the longitudinal axis of said shafts are parallel to said surface as well as when tilted relative thereto; and h. power means for rotating at least one of said rollers to impart motion to said belt.

16. A device as defined in claim 15 which in addition includes:

i. a sequence of longitudinally aligned first teeth on the interior surface of said belt; and j. a circumferentially extending sequence of second teeth on said rearward roller that engage said first teeth, with said power means rotating said rearward roller.

* * * * *